(12) United States Patent
Vadlamani et al.

(10) Patent No.: US 11,718,143 B2
(45) Date of Patent: *Aug. 8, 2023

(54) SYSTEMS AND METHODS FOR HEATING AND COOLING A VEHICLE USING A HEAT PUMP

(71) Applicant: PACCAR INC., Bellevue, WA (US)

(72) Inventors: Uday Vadlamani, Mount Vernon, WA (US); Mike Young, Mount Vernon, WA (US); Costi Nedelcu, Mount Vernon, WA (US)

(73) Assignee: PACCAR Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/479,875

(22) Filed: Sep. 20, 2021

(65) Prior Publication Data

US 2022/0001716 A1 Jan. 6, 2022

Related U.S. Application Data

(63) Continuation of application No. 15/970,761, filed on May 3, 2018, now Pat. No. 11,124,041.

(51) Int. Cl.
*B60H 1/00* (2006.01)
*B60H 1/32* (2006.01)
*F25B 25/00* (2006.01)

(52) U.S. Cl.
CPC ..... *B60H 1/00271* (2013.01); *B60H 1/00035* (2013.01); *B60H 1/0065* (2013.01); *B60H 1/00807* (2013.01); *B60H 1/3213* (2013.01); *F25B 25/005* (2013.01); *F25B 2339/04* (2013.01)

(58) Field of Classification Search
CPC .......... B60H 1/00271; B60H 1/0035; B60H 1/0065; B60H 1/00807; B60H 1/3213; F25B 25/005; F25B 3/06
See application file for complete search history.

(56) References Cited

U.S. PATENT DOCUMENTS

| 5,333,678 | A | 8/1994 | Mellum et al. |
| 6,009,355 | A | 12/1999 | Obradovich |
| 8,419,512 | B2 | 4/2013 | Creed |
| 11,124,041 | B2 | 9/2021 | Vadlamani |
| 2006/0005557 | A1 | 1/2006 | Takano |
| 2006/0011337 | A1 | 1/2006 | Paul |

(Continued)

FOREIGN PATENT DOCUMENTS

DE 102015106711 11/2015

OTHER PUBLICATIONS

European Extended Search Report in Application 19796521.3, dated Jan. 20, 2022, 11 pages.

(Continued)

*Primary Examiner* — Elizabeth J Martin
(74) *Attorney, Agent, or Firm* — Merchant & Gould P.C.

(57) ABSTRACT

Systems and methods for heating and cooling a vehicle using a heat pump are disclosed herein. In one embodiment, a system for heating and cooling the vehicle includes a heat pump having: a compressor located in an engine compartment of the vehicle, and an evaporator located in a sleeper or a cab of the vehicle. The system also includes a controller for selecting a cooling mode or a heating mode for the heat pump.

20 Claims, 7 Drawing Sheets

(56) References Cited

U.S. PATENT DOCUMENTS

| | | |
|---|---|---|
| 2006/0112702 A1 | 6/2006 | Martin |
| 2008/0264088 A1 | 10/2008 | Hirsch |
| 2009/0179080 A1 | 7/2009 | Alston |
| 2011/0114405 A1 | 5/2011 | Perhats |
| 2015/0130601 A1 | 5/2015 | Obradovich |
| 2015/0298522 A1 | 10/2015 | Hirabayashi |
| 2017/0144510 A1* | 5/2017 | Zeigler ............. B60H 1/00428 |
| 2018/0257481 A1 | 9/2018 | Zhou |
| 2019/0204022 A1 | 7/2019 | Johansson |

OTHER PUBLICATIONS

PCT International Preliminary Report on Patentability in International Application PCT/US2019/030671, dated Nov. 12, 2020, 7 pages.
PCT International Search Report and Written Opinion dated Aug. 8, 2019, issued in corresponding International Application No. PCT/US2019/0030671, filed May 3, 2019, 7 pages.
European Communication pursuant to Article 94(3) EPC in Application 19796521.3, dated Feb. 1, 2023, 6 pages.

* cited by examiner

SYSTEMS AND METHODS FOR HEATING AND COOLING A VEHICLE USING A HEAT PUMP

CROSS-REFERENCE TO RELATED APPLICATIONS

This application is a continuation of U.S. patent application Ser. No. 15/970,761, now U.S. Pat. No. 11,124,041, filed on May 3, 2018, the disclosure of which is incorporated herein by reference in its entirety.

BACKGROUND

Some vehicles, such as over-the road trucks, include a sleeping compartment ("sleeper") attached to a cabin ("cab"). The driver may rest or sleep in the sleeper either while the second driver operates the truck or when the truck is parked, for example, for the night, during mandatory rest periods, etc. These rest periods in the sleeper are referred to as "hoteling" in the trucking industry.

FIG. 1 is a side plan view of a truck 10 in accordance with conventional technology. The truck ("tractor") 10 may be part of a tractor-trailer combinations, which typically includes the tractor or truck 10 having a so-called fifth wheel by which a box-like semi-trailer 20 may be attached for transporting cargo or the like. The truck 10 includes a cab 12 and an attached sleeper 14. The sleeper 14 is typically equipped with a secondary heating and cooling system to keep the driver comfortable in different climates.

With some conventional systems truck engine must be running for the heating/cooling system to operate. However, these systems are relatively expensive to run, because the truck engine must idle to provide power for the cooling system or to provide waste heat (e.g., from the engine radiator) for the heating system. Furthermore, clean air regulations of many jurisdictions already limit engine idling, and these limitations are expected to become more severe in the future.

Some conventional truck hoteling systems use two separate systems to provide heating and cooling of the sleeper. With these conventional systems, heating is provided by a fuel fired heater, and cooling is provided by a battery powered air conditioning system. However, the run-time of these systems is limited, due to limited capacity of the battery. Once discharged or nearly discharged, the batteries may need several hours to recharge. Furthermore, the heating system requires a separate supply of fuel or some method of tapping into the existing fuel tank to generate required heat in the sleeper.

Accordingly, there remains a need for cost- and space-effective truck sleeper heating and cooling systems that aims to address one or more problems of prior art systems.

SUMMARY

This summary is provided to introduce a selection of concepts in a simplified form that are further described below in the Detailed Description. This summary is not intended to identify key features of the inventive technology, nor is it intended to be used as an aid in determining the scope of the claimed subject matter.

Briefly, the inventive technology uses a heat pump to provide both heating and cooling for the sleeper as needed to keep the driver comfortable in different climactic conditions. The heat pump (also referred to as the "heating air conditioning and ventilation" or HVAC) can provide either heating or cooling based on, e.g., the position of a reversing valve. When operating in the cooling mode, the evaporator of the heat pump absorbs energy from the sleeper, therefore cooling down the sleeper. Conversely, when operating in the heating mode, the evaporator releases energy (heat) into the sleeper.

In some embodiments, the evaporator may transfer heat to the sleeper through an intermediate heat exchanger and further through heating/cooling lines laid out through the sleeper. As a result, in some embodiments air ducts for heating/cooling may be eliminated, resulting in a more uniform temperature distribution inside the sleeper.

In some embodiments, a compressor of the heat pump is powered off the truck transmission through a clutch, an engageable gear, or other means of power take-off (PTO) from the transmission. In some embodiments, waste heat from transmission radiator or engine radiator supplements the action of the compressor. For example, a condenser of the heat pump may utilize the waste heat to improve the overall efficiency of the heat pump.

In some embodiments, the sleeper may be pre-heated or pre-cooled while the truck is still running, and while the compressor draws power from the PTO. Once at the "hoteling" location, the compressor only needs to run intermittently to maintain a desired temperature set point in the sleeper. The operation of the compressor may be synchronized with the time when the engine runs (e.g., for the truck that moves within a loading depot, or under a stop/start regime of the truck engine in a city traffic).

In some embodiments, one or more heat exchangers may be attached to the truck engine to preheat the engine before starting the truck. The heat exchangers may be in fluid communication with the evaporator of the heat pump to transfer heat from the evaporator to the engine, thus warming up the engine before starting the truck. Under some climactic conditions, for example when the outside temperature is moderately cold, the energy released by the evaporator of the heat pump may significantly exceed the energy input required for the operation of the compressor from, for example, truck batteries. Therefore, for each unit of energy provided by the battery, multiple units of energy may be released to heat the engine of the truck.

In one embodiment, a system for heating and cooling a vehicle includes a heat pump having: a compressor configured in an engine compartment of the vehicle, and an evaporator configured in a sleeper or a cab of the vehicle. The system also includes a controller configured to select a cooling mode or a heating mode for the heat pump. In one aspect, the system also includes a clutch configured to engage the compressor with a transmission of the vehicle. In another aspect, the system also includes a battery configured to energize the compressor of the heat pump.

In one aspect, the system includes: a condenser heat exchanger of the heat pump; and a fluid conduit configured to provide a flow of an engine radiator fluid or a transmission radiator fluid to the condenser heat exchanger. In another aspect, the system also includes: a first sleeper heat exchanger configured to exchange heat with the evaporator; a second sleeper heat exchanger configured to exchange heat with the sleeper; and a pump configured to circulate sleeper circulating fluid through the first sleeper heat exchanger and the second sleeper heat exchanger. In one aspect, the system also includes a fan configured to blow air over the second sleeper heat exchanger.

In one aspect, the system includes an engine heater configured to receive heat from the evaporator. In another aspect, the system also includes at least one sensor configured to provide input to the controller. In one embodiment, the vehicle is a class 8 truck.

In one embodiment, a method for heating and cooling a vehicle includes: sensing a temperature inside a sleeper of the vehicle; and based on sensing the temperature, activating a compressor of a heat pump by a controller. The compressor is configured in an engine compartment of the vehicle. The method also includes setting a position of a reversing valve by the controller, where the position of the reversing valve sets the heat pump into one of a cooling mode and a heating mode. The method also includes flowing a refrigerant into an evaporator of the heat pump, where the evaporator is configured in the sleeper or a cab of the vehicle.

In one aspect, the method includes drawing a power for the compressor from a transmission of the vehicle. In another aspect, the compressor and the transmission are connected through a clutch. In one aspect, the method includes drawing a power for the compressor from a battery when an engine of the vehicle does not operate. In another aspect, the method includes charging the battery when the engine of the vehicle operates.

In one aspect, the method includes: determining a remaining power of the battery; estimating a remaining run time for the battery; and displaying the remaining run time for the battery as a message on a dashboard of the vehicle. In another aspect, the method includes: sensing a current ambient temperature at a current location of the vehicle; obtaining a target ambient temperature at a target hoteling location of the vehicle; and pre-heating or pre-cooling the sleeper based on the temperature inside a sleeper, the current ambient temperature, and the target ambient temperature.

In one aspect, the method includes: operating the vehicle within a loading depot or an automatic engine shut down timer (AEIST) area; drawing a power for the compressor from a transmission of the vehicle when an engine of the vehicle when the engine operates; and drawing the power for the compressor from a battery when the engine does not operate.

In one aspect, the method includes: flowing an engine radiator fluid or a transmission radiator fluid to a condenser heat exchanger of the heat pump; and transferring heat from the engine radiator fluid or the transmission radiator fluid to a refrigerant at the condenser of the heat pump. In another aspect, the method includes: before an engine of the vehicle is started, operating the heat pump from a battery; before the engine of the vehicle is started, transferring heat from the evaporator to a heater of the engine by flowing a fluid from the evaporator to the heater of the engine; and after the engine of the vehicle is started, terminating operating the heat pump from the battery. In another aspect, the method includes: after the engine of the vehicle is started, operating the compressor by drawing power from a transmission of the vehicle; and after the engine of the vehicle is started, terminating transferring heat from the evaporator to the heater of the engine.

DESCRIPTION OF THE DRAWINGS

The foregoing aspects and many of the attendant advantages of this inventive technology will become more readily appreciated as the same become better understood by reference to the following detailed description, when taken in conjunction with the accompanying drawings, wherein.

DETAILED DESCRIPTION

The following disclosure describes various embodiments of systems and associated methods for heating and cooling a vehicle using a heat pump. A person skilled in the art will also understand that the technology may have additional embodiments, and that the technology may be practiced without several of the details of the embodiments described below with reference to FIGS. 2-7.

Although exemplary embodiments of the present disclosure will be described hereinafter with reference to a vehicle, such as a heavy duty truck, it will be appreciated that aspects of the present disclosure have wide application, and therefore, may be suitable for use with many other types of vehicles that with "hoteling" features, including but not limited passenger vans, motor homes, buses, marine vessels, etc. Accordingly, the following descriptions and illustrations herein should be considered illustrative in nature, and thus, not limiting the scope of the claimed subject matter.

Figure 1:
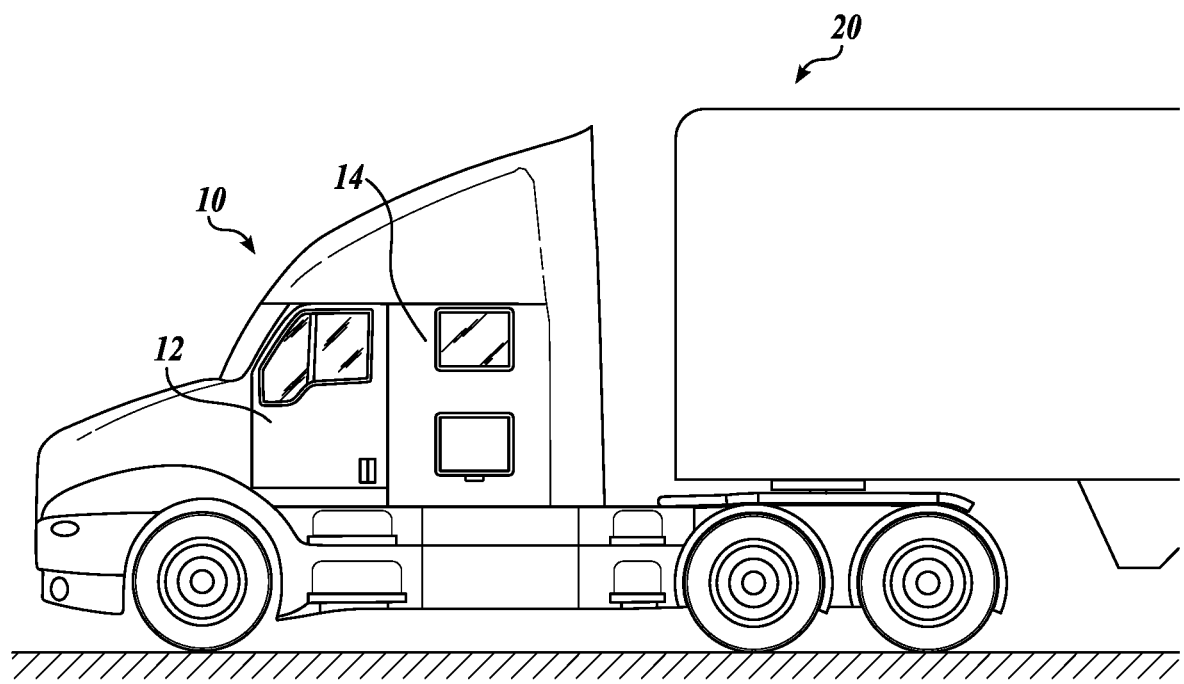
FIG. 1 is a side plan view of a truck in accordance with conventional technology.
Figure 2:
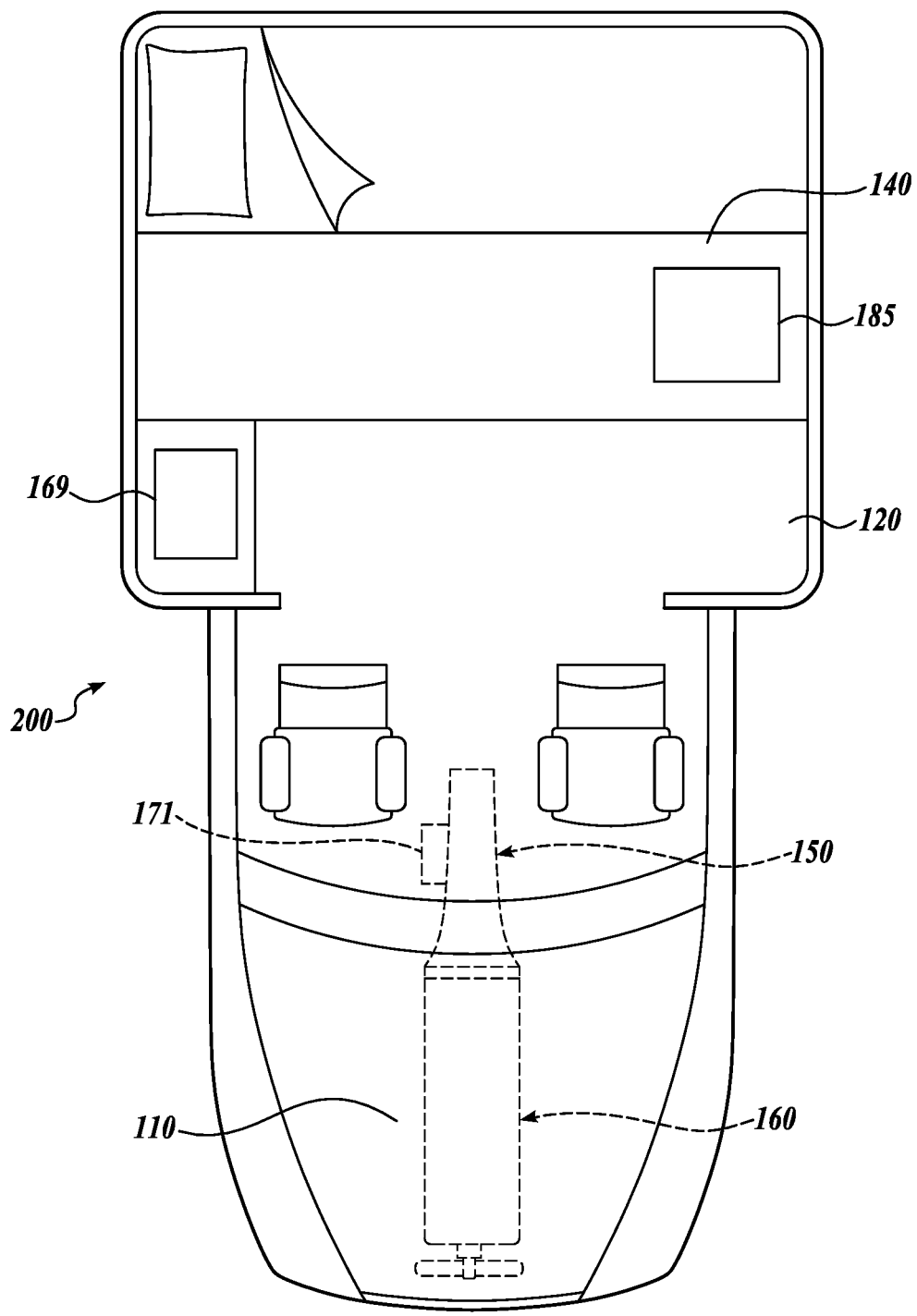
FIG. 2 is a top plan view of a vehicle in accordance with an embodiment of the present technology.

FIG. 2 is a top view of a vehicle 200 in accordance with an embodiment of the present technology. The vehicle 200 (e.g., a tractor, such as a class 8 truck) includes a sleeper 140 attached to a cab 120. An engine compartment 110 houses an engine 160, which is coupled to a transmission 150 for transmitting power to the drive wheels (not shown).

In some embodiments, the sleeper 140 is heated or cooled by an evaporator 185 of a heat pump. While the engine 160 runs, a compressor 171 of the heat pump may draw power off the transmission 150. When the engine 160 is not running, a battery 169 may provide power to the compressor 171. In some embodiments, the battery 169 is a main battery for the vehicle 200 for vehicle start-up, etc. In other embodiments, the battery 169 is an auxiliary battery dedicated to powering the compressor of the heat pump. In operation, the evaporator 185 can cool or heat the sleeper 140 and/or the cab 120, as explained below with reference to FIGS. 3 and 4. In the illustrated embodiment, the evaporator 185 is located in the sleeper 140, but in different embodiments the evaporator may be located in the cab 120.

Figure 3:
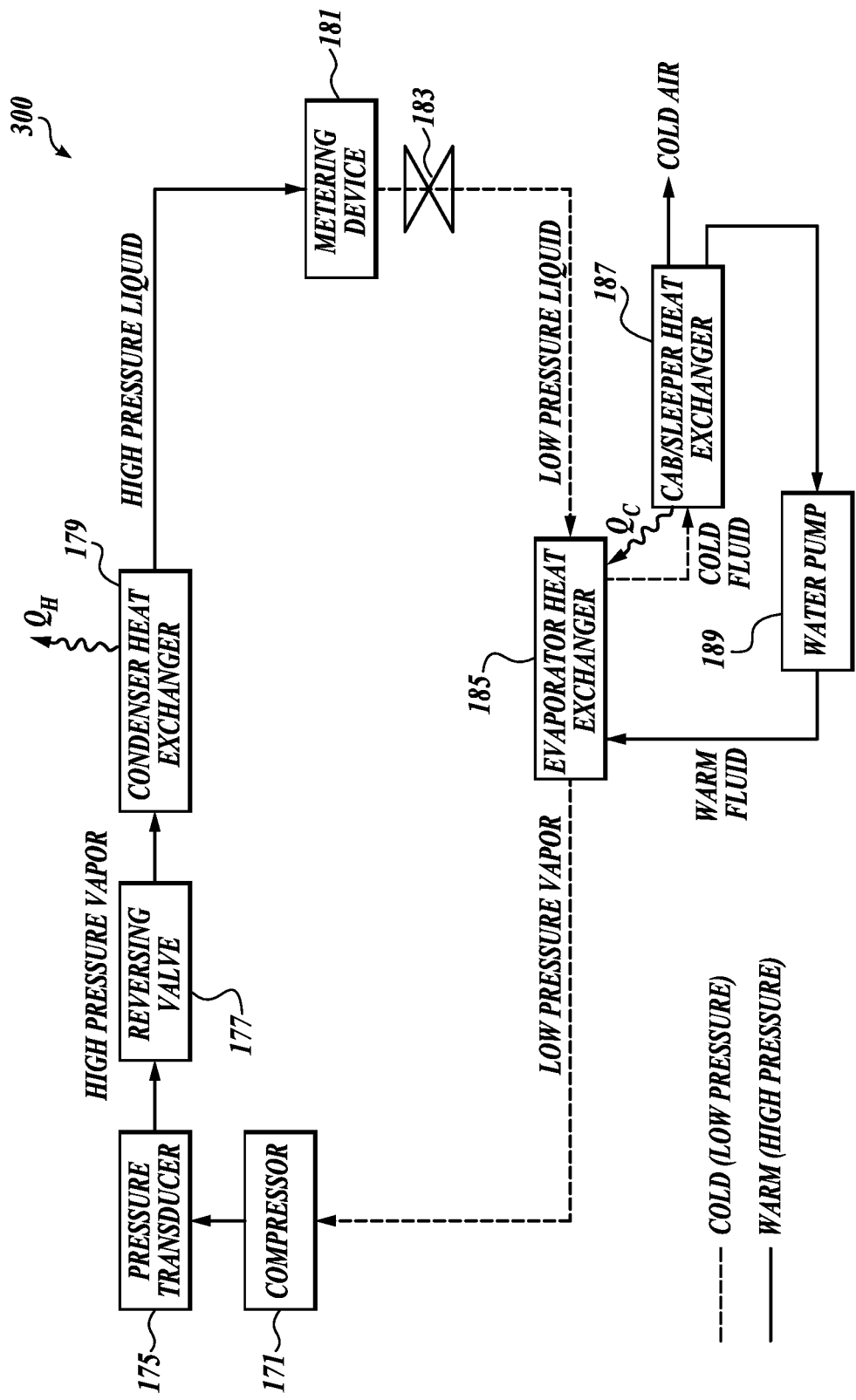
FIG. 3 is a schematic view of a heat pump operating in a cooling mode in accordance with an embodiment of the present technology.

Turning now to FIG. 3, there is shown a schematic view of a heat pump 300 operating in a cooling mode in accordance with an embodiment of the present technology. In operation, the compressor 171 compresses a vapor, such as a refrigerant, from a low pressure (shown as a dashed line in FIG. 3) to a high pressure (shown as a solid line in FIG. 3). In some embodiments, the heat pump 300 includes a pressure transducer 175 for monitoring the pressure of the vapor at the outlet side of the compressor 171.

The heat pump 300 includes a reversing valve 177 that directs the high pressure vapor generator by the compressor 171 to a condenser heat exchanger 179. In some embodiments, the reversing valve 177 is a 4-way valve that connects different components of the heat pump depending on the desired mode of operation. For example, when the heat pump 300 operates in the cooling mode, the high pressure vapor is directed from the pressure transducer 175 (or directly from the compressor 171 when the pressure transducer is not used) to a condenser heat exchanger 179. Conversely, when the heat pump operates in the heating mode, the reversing valve 177 directs a high pressure vapor from the compressor 171 to the evaporator heat exchanger 185, as explained with reference to FIG. 4. Additionally, the reversing valve 177 directs a low pressure vapor from the condenser heat exchanger 179 to the compressor 171.

After exiting the reversing valve 177, the high pressure vapor enters the condenser heat exchanger 179 that rejects heat $Q_H$ to the environment. In the process, the high pressure vapor at the inlet of the condenser heat exchanger 179 condenses into a high pressure liquid. Next, an expansion valve 183 reduces pressure of the high pressure liquid.

Continuing with the operation of the heat pump in the cooling mode, a low pressure liquid flows from the expansion valve 183 to an evaporator (also referred to as an "evaporator heat exchanger") 185, where heat $Q_C$ is received from the environment. In response, the low pressure liquid evaporates into a low pressure vapor. In some embodiments, the evaporator 185 is positioned at either the sleeper 140 or the cab 120. The low pressure vapor returns to the compressor 171, and the cycle repeats.

In some embodiments, the sleeper and/or cab 140 includes one or more cab/sleeper heat exchangers 187 for transferring heat from the sleeper to the evaporator 183. For example, a sleeper pump 189 (also referred to as the "pump 189") may pump a sleeper fluid (e.g., a mixture of water and antifreeze, for example, glycol) through the evaporator 185 where the sleeper fluid is cooled to a lower temperature. This colder sleeper fluid flows to the sleeper heat exchanger 187 to absorb heat from the sleeper. The warmed up sleeper fluid is then pumped back to the evaporator 185, and the cycle continues. For simplicity and brevity, the heat exchanger 187 is referred to as a "sleeper heat exchanger," although the heat exchanger 187 may be located either in the sleeper 140, cab 120, or across both the sleeper 140 and the cab 120. Analogously, the fluid that circulates through the heat exchanger(s) 187 and the sleeper pump 189 is referred to as a "sleeper circulating fluid" or "sleeper fluid" although these components may be distributed through the sleeper 140 and/or cab 120.

In some embodiments, air is blown to the sleeper heat exchanger 187 to improve heat transfer from the sleeper circulating fluid to the liquid (e.g., refrigerant, etc.) of the heat pump 300. The sleeper heat exchanger 187 may be positioned below the floor of the sleeper 140 for improved comfort of the driver. In some embodiments, multiple heat sleeper heat exchangers 187 may be distributed within the sleeper 140.

Figure 4:
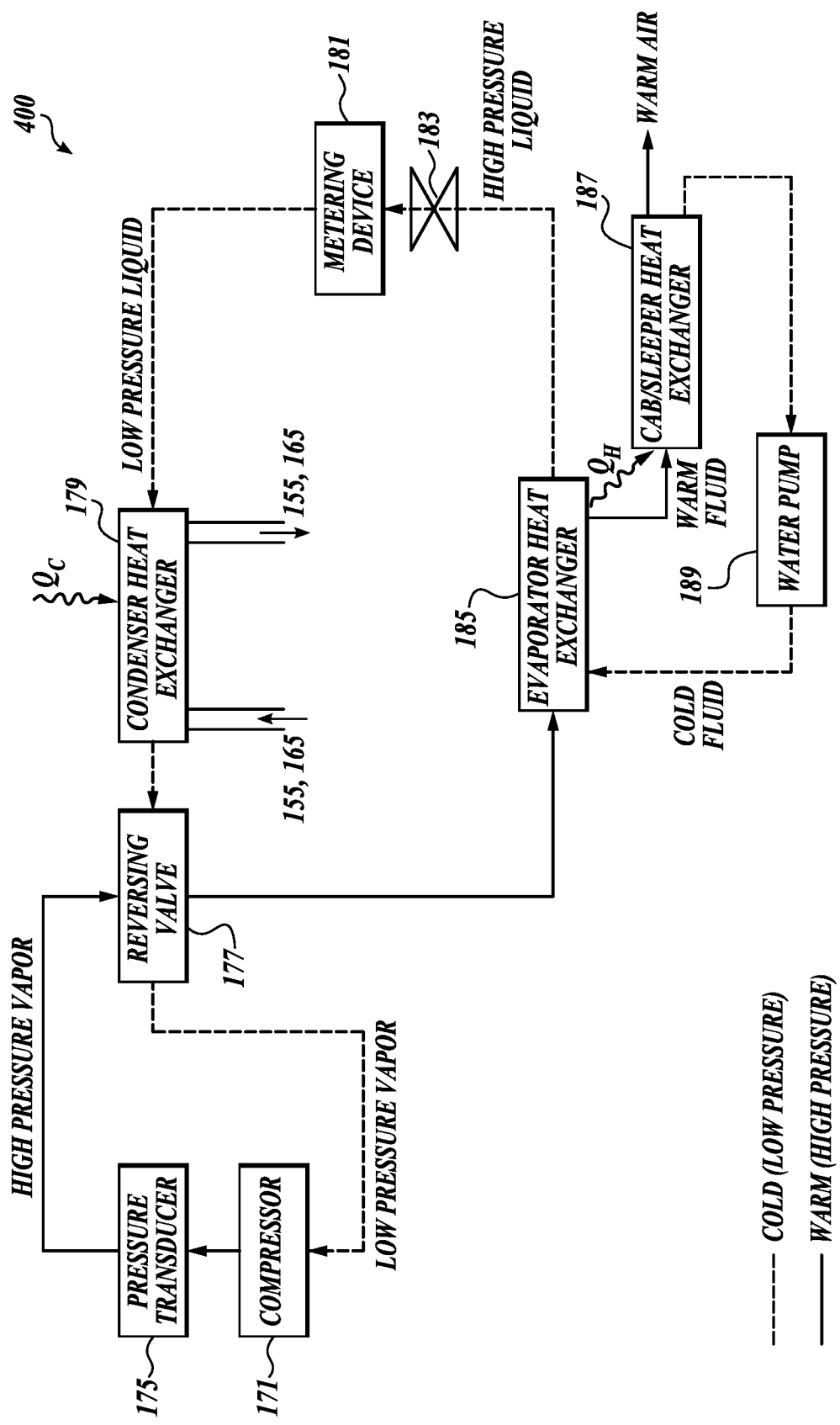
FIG. 4 is a schematic view of a heat pump operating in a heating mode in accordance with an embodiment of the present technology.

FIG. 4 is a schematic view of a heat pump 400 operating in a heating mode in accordance with an embodiment of the present technology. In the heating mode, the reversing valve 177 connects the output from the condenser heat exchanger 179 (low pressure vapor) to the compressor 171, and the output from the compressor 179 (high pressure vapor) to the evaporator 185. As a result of this routing of the liquid, such as a refrigerant, the condenser heat exchanger absorbs heat $Q_C$ from the environment. Conversely, the evaporator heat exchanger 185 rejects heat $Q_H$ from the incoming high pressure vapor into the sleeper heat exchanger 187. Therefore, in the heating mode of the heat pump, the sleeper 140 and the cab 120 receive heat $Q_H$ from the sleeper fluid that is warmed by flowing through the evaporator 185.

Figure 5:
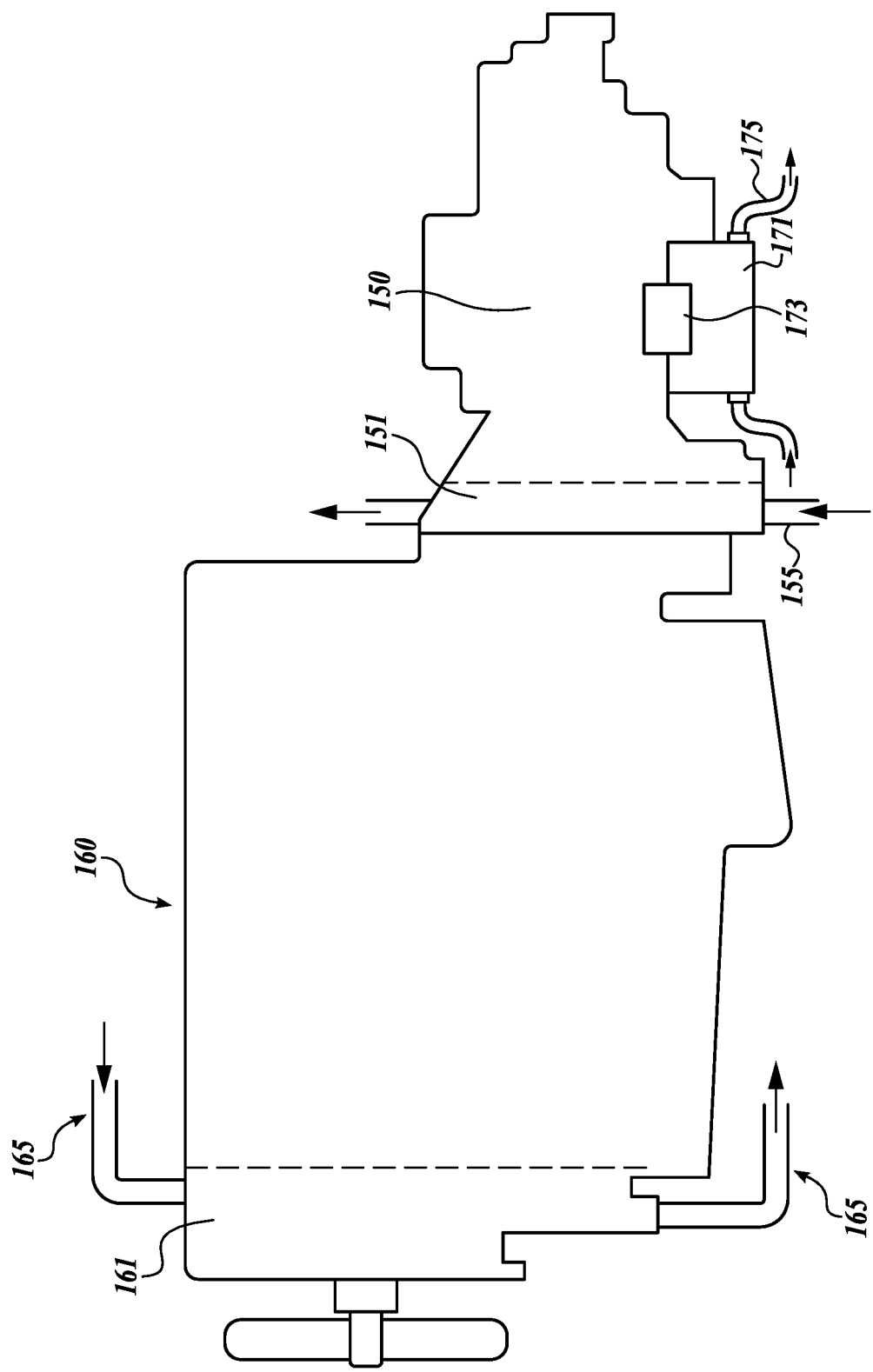
FIG. 5 is a partially schematic view of a heat pump compressor in accordance with an embodiment of the present technology.

Turning now to FIG. 5, there is shown a partially schematic view of the heat pump compressor in accordance with an embodiment of the present technology. In some embodiments, the compressor 171 draws power off the truck transmission through a clutch 173. In other embodiments, an engageable gear, or other means of power take-off (PTO) can transfer power from the transmission 150 to the compressor 171. In at least some embodiments, powering the compressor 171 off the transmission is more efficient than powering the compressor with a conventional drive belt.

In operation, the engine 160 and the transmission 150 generate waste heat that is transferred to engine coolant in engine radiator 161 and to transmission coolant in transmission radiator 151. This waste heat is transported away by fluid conduits 165 (e.g., pipes or hoses) from the engine radiator 161 and by fluid conduits 155 (e.g., pipes or hoses) from the transmission radiator 151. Ultimately, waste heat is rejected into the environment. In some embodiments of the present technology, waste heat may improve the operation of the heat pump. For example, when the heat pump operates in the heating mode, the engine coolant and/or transmission coolant may be routed to the condenser heat exchanger 179 to provide additional heat for the condenser heat exchanger. As a result, the efficiency of the heat pump is improved.

Figure 6:
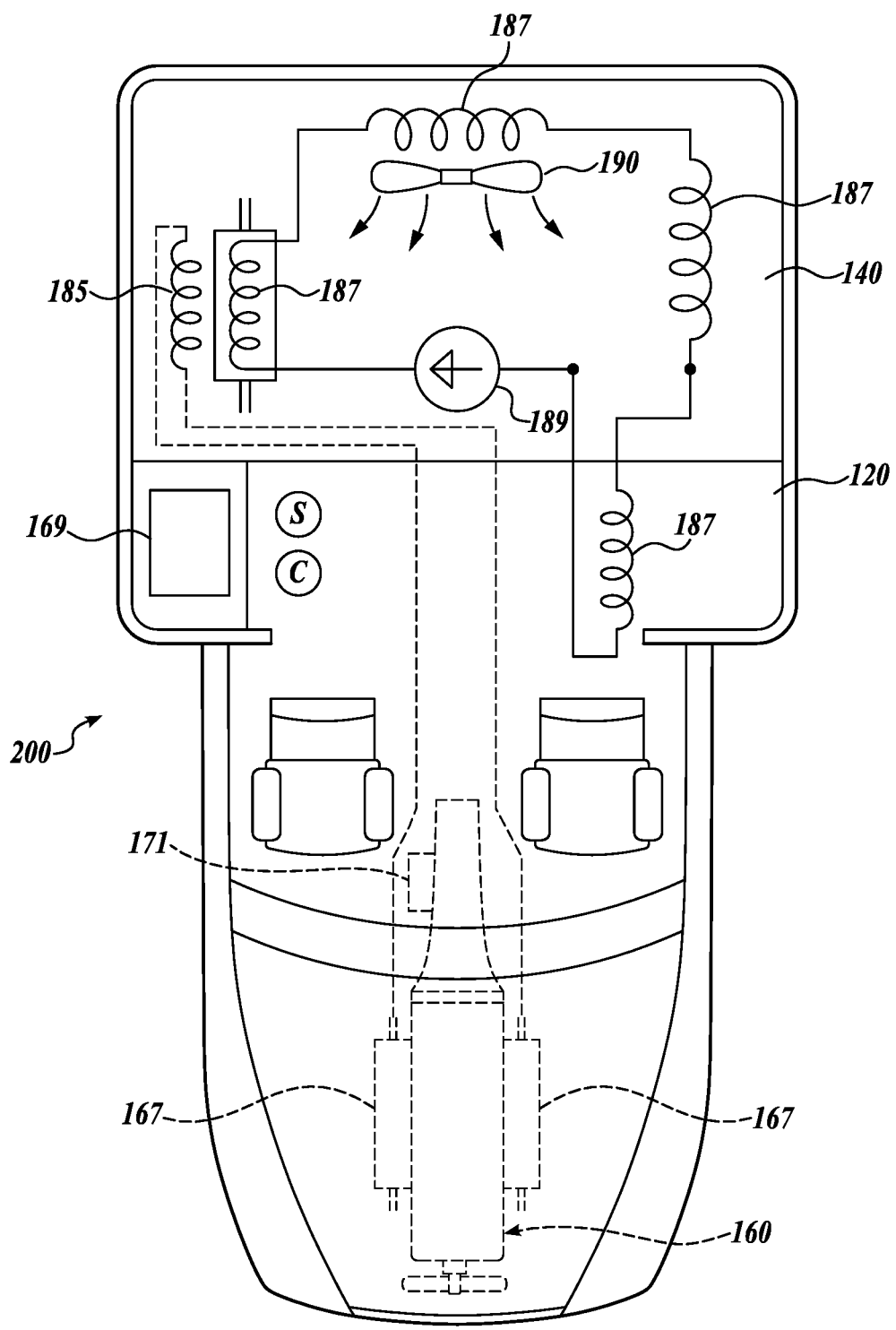
FIG. 6 is a top plan view of a vehicle in accordance with an embodiment of the present technology.

FIG. 6 is a top plan view of a vehicle in accordance with an embodiment of the present technology. In some embodiments, the evaporator 185 of the heat pump is positioned at the sleeper 140. Heat can be transferred from the evaporator 185 to the sleeper (in the heating mode) or from the sleeper 140 to the evaporator 185 (in the cooling mode) through one or more heat exchangers 187. In some embodiments, the heat exchangers 187 are coils inside the sleeper. In some embodiments, transfer of heat from the heat exchangers 187 may be improved by air movers, for example, a fan 190.

In some embodiments, one or more heaters 167 can preheat the engine 160 before the engine is started. The compressor 171 may be powered from the battery 169 when the engine is not running. In some embodiments, engine heaters 167 are attached to or are proximal to the engine 160. The heat from the evaporator 185 may be transferred to the engine heaters 167 by circulating the water/antifreeze mixture that already circulates within the sleeper 140 and/or the cab 120, or through a separate loop between the evaporator 185 and the heaters 167. In some situations, for example when the outside temperature is not excessively low (e.g., not below 0° C. or not below −5° C.), the heat pump that operates in the heating mode can be relatively efficient, thus providing significantly more energy to the engine than the energy provided by the battery 169 to the compressor 171.

In some embodiments, one or more sensors S provide input to a controller C for controlling the heat pump. The sensors may be, for example, temperature sensors, global positioning system, humidity sensors, etc. Based on the input from the sensors S, the controller C may control, for example, a sleeper pump 189, the compressor 171 or the reversing valve 179.

Figure 7:
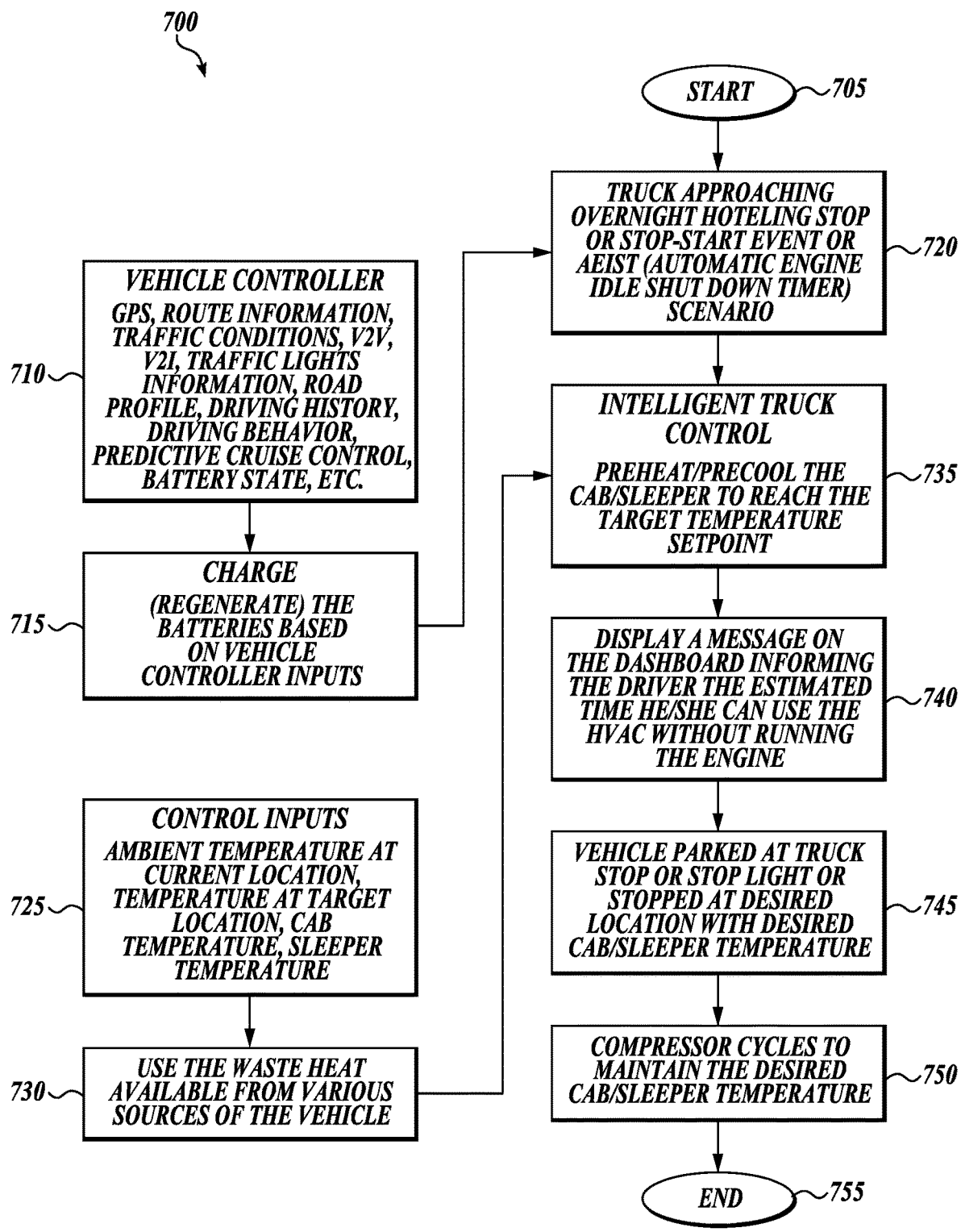
FIG. 7 is a flowchart of a method for controlling a heat pump in accordance with an embodiment of the present technology.

FIG. 7 is a flowchart 700 of a method for controlling a heat pump in accordance with an embodiment of the present technology. In some embodiments, the method may include only some of the steps in the flowchart, or may include additional steps that are not illustrated in the flowchart 700. It will be appreciated that some of the steps described below can be carried out in parallel, serially, or in an order different than set forth in FIG. 7 and described below.

The method starts in block 705. At block 710, a controller of the vehicle receives inputs for controlling the heat pump. Some examples of such inputs are location of the vehicle (e.g., based on the GPS information), route information, traffic conditions, vehicle to vehicle communication (V2V), vehicle to infrastructure communication (V2I), information about the traffic lights in the path of the vehicle, road profile, etc. The inputs may also relate to driver behavior or past history of the driver. In some embodiments, the controller may also take inputs from another system of the vehicle, such as a predictive cruise control, or from the status of the battery (e.g., voltage of the battery 169).

At block 715, the vehicle 200 is driven on the road or, if the vehicle is stationary, at least the engine is still running. Based on the inputs acquired in block 710, the controller may issue instructions, for example, for charging the battery 169 or for engaging the clutch 173 with the compressor 171.

At block 720, the vehicle 200 approaches an hoteling stop, a stop-start event (e.g., driving within a loading depot) or an automatic engine shut down timer (AEIST) area (e.g., an area with a restricted duration of the engine idle).

At block 725, the controller processes additional inputs for optimizing performance of the heat pump. For example, the controller may assess ambient temperatures at the current location and/or at the target hoteling location. Other examples of the inputs to the controller are cab temperature, sleeper temperature, engine temperature, etc.

At block 730, the controller decides whether to use waste heat for improving the performance of the heat pump. In different embodiments, the waste heat may be provided from the engine or the transmission of the vehicle. For example, the engine coolant or the transmission coolant may be routed to the condenser heat exchanger 179. By receiving additional heat from the engine coolant and/or the transmission coolant, performance of the heat pump is improved, especially if running in the heating mode and/or at a relatively low ambient temperature (e.g., below 0° C., below −5° C. or below −18° C.).

At block 735, the controller provides control for pre-heating or pre-cooling the sleeper 140 based on, for example, the present temperature of the sleeper, ambient air temperature, the target temperature of the sleeper, driving time remaining to the hoteling stop, etc. Such control may be termed "intelligent truck control."

At block 740, the vehicle 200 is at a hoteling stop, at an AEIST event or within a limited idle area. In some embodiments, the controller displays a message about the remaining use time of the heat pump. The message may be displayed, for example, on the truck dashboard. In some embodiments, the message may be audible (e.g., announced through the speaker system of the truck).

At block 745, the vehicle is at rest at the hoteling stop, within the loading depot, or within a stop/drive zone (e.g., dense urban environment).

At block 750, the controller cycles the compressor of the heat pump to maintain the set point of the sleeper and/or cab. In some embodiments, the operation of the compressor may be controlled such that it coincides with the time segments when the engine operates during the hoteling stop. For example, the controller may disengage the clutch of the compressor when the engine is turned off at the red light or stop-start event, and engage the clutch of the compressor when the engine restarts again. In many embodiments, such timed operation of the compressor 171 preserves the energy of the battery 169. Generally, the engine of the truck can provide much more energy than the battery 169. Therefore, the compressor 171 is typically powered off the transmission when the engine runs. When the engine does not run, and the compressor 171 needs to operate, the power to the compressor is provided from the battery 169. The method ends in block 755.

Many embodiments of the technology described above may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, application specific integrated circuit (ASIC), controller or data processor that is specifically programmed, configured or constructed to perform one or more of the computer-executable instructions described above. Of course, any logic or algorithm described herein can be implemented in software or hardware, or a combination of software and hardware.

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

We claim:

1. A system for heating and cooling a vehicle, comprising:
a heat pump comprising:
a compressor configured in an engine compartment of the vehicle, and an evaporator configured in a sleeper or a cab of the vehicle;
a controller configured to select a cooling mode or a heating mode for the heat pump; and
a heater of an engine of the vehicle, wherein the heater is fluidly connected to the evaporator;
wherein the controller comprises:
a processor; and
a memory, operatively connected to the processor, storing instructions that, when executed, cause the system to:
sense a temperature inside the sleeper of the vehicle;
based on sensing the temperature, activate the compressor;
flow a refrigerant into the evaporator;
before the engine is started, operate the compressor from a battery;
before the engine is started, transfer heat from the evaporator to the heater by flowing the refrigerant from the evaporator to the heater of the engine;
after the engine is started, terminate operating the compressor from the battery and initiate charging the battery.

2. The system according to claim 1, further comprising a battery configured to energize the compressor of the heat pump.

3. The system according to claim 1, wherein the system is operable in at least one of a heating mode and a cooling mode.

4. The system according to claim 1, wherein the system includes a reversing valve, and the instructions cause the system to set a position of a reversing valve, wherein the position of the reversing valve sets the system into one of a heating mode and a cooling mode.

5. The system according to claim 1, further comprising:
    a first sleeper heat exchanger configured to exchange heat with the evaporator;
    a second sleeper heat exchanger configured to exchange heat with the sleeper; and
    a pump configured to circulate sleeper circulating fluid through the first sleeper heat exchanger and the second sleeper heat exchanger.

6. The system according to claim 5, further comprising a fan configured to blow air over the second sleeper heat exchanger.

7. The system according to claim 1, wherein the instructions further cause the system to:
    determine a remaining power of the battery;
    estimate a remaining run time for the battery; and
    display the remaining run time for the battery as a message on a dashboard of the vehicle.

8. The system according to claim 1, wherein the instructions further cause the system to:
    after the engine is started, operate the compressor by drawing power from the transmission of the vehicle.

9. The system according to claim 1, further comprising a clutch operatively connecting the compressor to a transmission of the vehicle.

10. A method for heating and cooling a vehicle, comprising:
    sensing a temperature inside a sleeper of the vehicle;
    based on sensing the temperature, activating a compressor of a heat pump by a controller, wherein the compressor is configured in an engine compartment of the vehicle;
    flowing a refrigerant into an evaporator of the heat pump, wherein the evaporator is configured in the sleeper or a cab of the vehicle;
    before the engine is started, operating the compressor from a battery;
    before the engine is started, transferring heat from the evaporator to the heater by flowing the refrigerant from the evaporator to the heater of the engine;
    after the engine is started, terminating operating the compressor from the battery and initiate charging the battery.

11. The method of claim 10, wherein the compressor is operatively connected to a transmission of the vehicle through a clutch.

12. The method of claim 11, further comprising engaging the clutch with the compressor.

13. The method of claim 10, further comprising:
    sensing a current ambient temperature at a current location of the vehicle;
    obtaining a target ambient temperature at a target hoteling location of the vehicle; and
    pre-heating or pre-cooling the sleeper based on the temperature inside a sleeper, the current ambient temperature, and the target ambient temperature.

14. The method of claim 10, further comprising:
    determining a remaining power of the battery;
    estimating a remaining run time for the battery; and
    displaying the remaining run time for the battery as a message on a dashboard of the vehicle.

15. The method of claim 10, further comprising:
    drawing a power for the compressor from the transmission of the vehicle when an engine of the vehicle when the engine operates.

16. The method of claim 10, further comprising setting a position of a reversing valve by the controller.

17. The method of claim 10, wherein the heat pump is selectably operable in one of a cooling mode or a heating mode.

18. The method of claim 10, further comprising:
    after the engine of the vehicle is started, operating the compressor by drawing power from a transmission of the vehicle; and
    after the engine of the vehicle is started, terminating transferring heat from the evaporator to the heater of the engine.

19. A vehicle comprising:
    a transmission;
    a battery;
    a clutch; and
    a heat pump comprising:
        a compressor in an engine compartment of the vehicle, wherein the clutch operatively connects the compressor to the transmission of the vehicle;
        an evaporator in a sleeper or a cab of the vehicle;
        a controller configured to select a cooling mode or a heating mode for the heat pump; and
        a heater of an engine of the vehicle, wherein the heater is fluidly connected to the evaporator;
    wherein the controller comprises:
        a processor; and
        a memory, operatively connected to the processor, storing instructions that, when executed, cause the system to:
            sense a temperature inside the sleeper of the vehicle;
            based on sensing the temperature, activate the compressor;
            flow a refrigerant into the evaporator;
            before the engine is started, operate the compressor from a battery;
            before the engine is started, transfer heat from the evaporator to the heater by flowing the refrigerant from the evaporator to the heater of the engine;
            after the engine is started, terminate operating the compressor from the battery and initiate charging the battery.

20. The vehicle of claim 19, further comprising:
    a first sleeper heat exchanger configured to exchange heat with the evaporator;
    a second sleeper heat exchanger configured to exchange heat with the sleeper;
    a pump configured to circulate sleeper circulating fluid through the first sleeper heat exchanger and the second sleeper heat exchanger; and
    a fan configured to blow air over the second sleeper heat exchanger.

* * * * *